(12) United States Patent
Kukis et al.

(10) Patent No.: US 10,169,920 B2
(45) Date of Patent: Jan. 1, 2019

(54) VIRTUAL GUARD RAILS

(71) Applicant: Intel Corporation, Santa Clara, CA (US)

(72) Inventors: Corey Kukis, Beaverton, OR (US); Robert Lawson Vaughn, Portland, OR (US); Timothy J. Gresham, Portland, OR (US); John Charles Weast, Portland, OR (US); Brandon Bohling, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 74 days.

(21) Appl. No.: 15/274,648

(22) Filed: Sep. 23, 2016

(65) Prior Publication Data

US 2018/0089893 A1    Mar. 29, 2018

(51) Int. Cl.
| | | |
|---|---|---|
| *G06T 19/00* | (2011.01) | |
| *G06F 3/01* | (2006.01) | |
| *G02B 27/01* | (2006.01) | |
| *G02B 27/00* | (2006.01) | |
| *G06F 1/16* | (2006.01) | |

(52) U.S. Cl.
CPC ........ *G06T 19/006* (2013.01); *G02B 27/0093* (2013.01); *G02B 27/017* (2013.01); *G06F 1/163* (2013.01); *G06F 3/011* (2013.01); *G02B 2027/014* (2013.01)

(58) Field of Classification Search
None
See application file for complete search history.

(56) References Cited

U.S. PATENT DOCUMENTS

| | | | |
|---|---|---|---|
| 2015/0254905 A1* | 9/2015 | Ramsby | G06T 19/006 345/419 |
| 2016/0066295 A1* | 3/2016 | Han | H04W 68/00 345/8 |
| 2016/0300388 A1* | 10/2016 | Stafford | A63F 13/211 |
| 2017/0285731 A1* | 10/2017 | Kwak | G06F 3/011 |
| 2017/0337352 A1* | 11/2017 | Williams | G06F 21/10 |
| 2018/0035101 A1* | 2/2018 | Osterhout | G02B 27/017 |

* cited by examiner

*Primary Examiner* — James A Thompson
(74) *Attorney, Agent, or Firm* — Schwegman Lundberg & Woessner, P.A.

(57) ABSTRACT

A method for virtual guard rail implementation includes collecting user parameters, representing user limitations, for a computer simulation executed by a computer. Execution of the computer simulation is monitored for virtual content that exceeds the user parameters. The monitoring may be performed in real-time and prior to presentation of the content on a display to the user. Virtual content that exceeds the user parameters is replaced with virtual guard rail content that remains within the user parameters.

22 Claims, 4 Drawing Sheets

VIRTUAL GUARD RAILS

TECHNICAL FIELD

Embodiments described herein pertain in general to virtual reality (VR) and augmented reality (AR) and in particular to providing user-controlled limitations for VR and AR operation.

BACKGROUND

Virtual reality (VR) is a computer simulation that creates or replicates an environment, imagined or real, and simulates a user's physical presence in that environment to allow for user interaction. VR systems, through various visual, audio, and tactile sensors, may artificially create an almost total sensory immersion experience for a user.

Augmented reality (AR) is a live direct or indirect view of a physical, real-world environment whose elements are augmented or supplemented by computer-generated sensory input such as sound, video, graphics, or other data. Using AR systems, the information about the surrounding real world of the user becomes interactive and digitally manipulable. Information about the environment and its objects is overlaid on the real world. The overlaid information may be a virtual object or real object overlaid on the real world.

VR and AR systems are gaining in popularity due to faster, more powerful computers, improved high resolution displays, and new content being written for these systems. The VR and AR generated environments may become so real and the user immersion so intense, that even the simulated environments may have physical and/or emotional consequences for the user.

DETAILED DESCRIPTION

A VR system typically provides complete visual immersion for the user while AR systems typically provide the user with direct views of their environment while only adding to (i.e., augmenting) that reality. However, the present embodiments are not limited to such conventions. Additionally, in the interest of brevity and clarity, disclosed embodiments may refer only to VR systems and VR methods. However, one of ordinary skill in the art would realize that such VR systems and methods would encompass AR systems and methods.

The increasing popularity and decreasing cost of VR systems has increased the amount of content available for these systems. For example, realistic games and other content may provide total visual and audio immersion for a user. Some users new to VR systems may not be aware of the realistic nature of some content while other users may be naturally more sensitive than most users to certain content. Such users may be harmed either emotionally from being startled by the excitement or rapid introduction of images or sounds. These users may also be startled from some content and end up harming themselves physically by interaction with the real world.

The various embodiments provide virtual guard rails that are user controlled in order to give the more sensitive users peace of mind when experiencing certain VR content. For example, the virtual guard rails may affect execution of the VR content so that: a computer simulation does not exhibit movement or acceleration that is too fast for a user, the VR audio does not change too dramatically or reach too high of a sound level, the VR images do not change angles or views too quickly, the VR content does not place the user in a simulated life threatening situation, or the VR content does not use flashing lights in a way to cause seizures.

As used herein a virtual guard rail may be defined as VR content that is consistent with the currently executing VR simulation but that is reduced in intensity to remain within user parameters. The user parameters, as described subsequently in greater detail, are set by the user prior to VR simulation execution and describe the content boundaries (e.g., level of scariness, top speed of movement, level of exposure to mayhem) to which the user is willing to be exposed.

Figure 1:
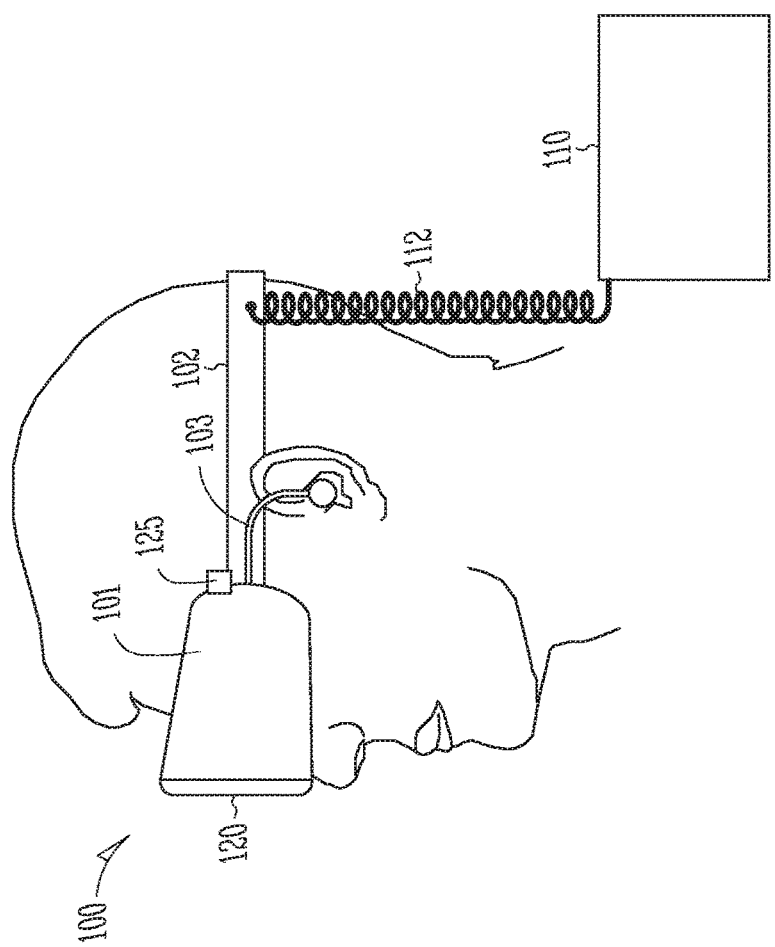
FIG. 1 illustrates an example of a VR system, according to various embodiments.

FIG. 1 illustrates an example of a VR system, according to various embodiments. This system is only for purposes of illustration and does not limit the method for virtual guard rail generation. Other VR systems may be used with the disclosed method.

The system includes a headset 100 having a display enclosure 101 and a display holder 102 (e.g., strap, ear hooks) to hold the display enclosure 101 against the user's face. The display enclosure 101 provides total enclosure of the user's vision so that the user is only able to see the display 120 within the enclosure 101 and not able to see the physical world. This visual isolation provides the immersive environment for the VR experience.

The display 120 may be any mechanism capable of producing video for the user. For example, the display 120 may include a high definition (HD) display, an ultra-high definition (UHD) display, liquid crystal display (LCD), or an organic light emitting diode (OLED) display.

An audio device 103 may be inserted in the user's ear or ears to provide sound from the VR generated environment. In another embodiment, a headset having one or more speakers may fit over the user's ear or ears.

In another embodiment, the functions of the display 120, display holder 102, and audio device 103 may be included in a helmet or partially enclosed helmet. For example, the system may include a half helmet that fits over the top of the user's head to provide all of the functions of the system.

The headset 100 may further include various sensors 125 such as position or movement sensors that may be located in the display enclosure 101, attached to the display holder 102, or within the helmet. The position or movement sensors may be used to monitor movement of the users head such that, when the user moves their head, the VR environment changes appropriate with the movement. For example, both the video displayed on the display 120 and the direction from which the sound is coming may change as the user's head moves. The position or movement sensors may include an accelerometer, an inclinometer, a compass (e.g., magnetometer), a global position system (GPS) receiver, and/or a gyroscope.

The VR system sensors 125 may also include biological sensors for measuring and tracking the user's biological data. For example, the biological sensors may include a heart rate sensor, a skin temperature sensor, a sensor to measure user perspiration, a respiration sensor, an eye tracking sensor, as well as other types of sensors to measure and track human biological data. The biological sensors may be located coincident with the position or movement sensors or in a separate system location.

Figure 3:
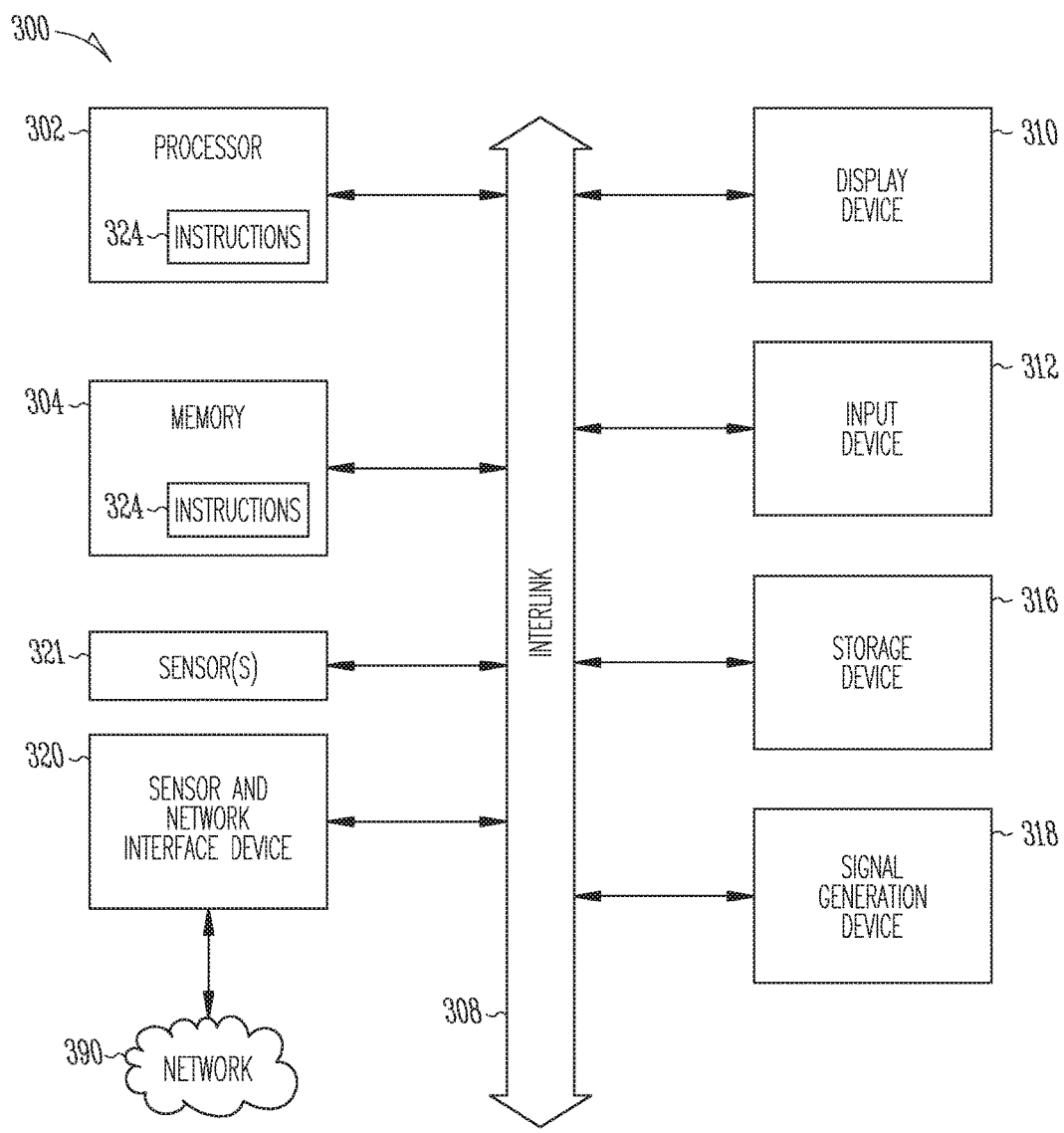
FIG. 3 illustrates a block diagram of the VR or AR systems, according to various embodiments.

A controller 110 is coupled to the headset 100 to provide control of the VR system, execution of any methods represented by software instructions, as well as storage and execution of the virtual content. The controller 110 may be a separate enclosure coupled to the headset 100 through a wired connection 112 or a wireless connection (e.g., Bluetooth, WiFi). The controller 110 may also be part of the headset 100. An example of a controller is illustrated in FIG. 3 and discussed subsequently.

One example of VR system operation may include VR content being presented to the user regarding flying an airplane or driving a race car. The user may be presented with cockpit images on the display 120 and engine and radio sounds from the audio device 103. By turning their head, the user may look out side windows, front windows, or the instrument panel in response to the system tracking their head movement and presenting different video images on the display 120. As discussed subsequently with regard to the method of FIG. 4, the virtual guard rail method is able to limit the content provided to the user based on input from user biological sensors, user preferences, and VR content.

Figure 2:
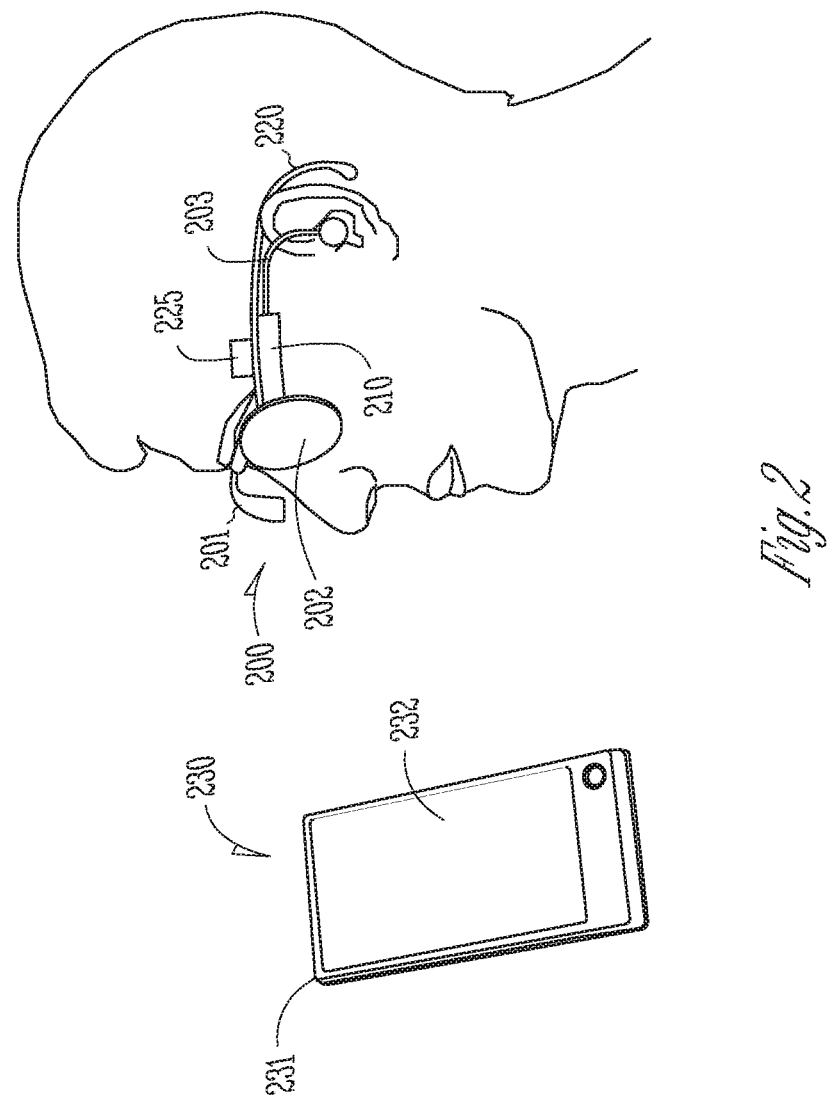
FIG. 2 illustrates an example of an AR system, according to various embodiments.

FIG. 2 illustrates an example of an AR system, according to various embodiments. This system is only for purposes of illustration and does not limit the method for guard rail generation. Other AR systems may be used with the disclosed method.

The AR system includes a headset 200 having a display 201, 202 and a display holder 220 (e.g., strap, ear hooks) to hold the display 201, 202 on the user's face. The display may take the form of a transparent or translucent portion 201 that sits in front of one or more of the user's eyes. The display may also take the form of a transparent eyeglass piece 202 such as a normal eyeglass lens. Using either display 201, 202, the AR system allows the user to be able to see the real, physical world while also being able to see the content being displayed on one or more of the displays 201, 202. Thus, the AR system augments the user's view of the physical world.

The AR content may be projected onto the displays 201, 202 with a controller/projector 210. The AR content may also be produced on the displays 201, 202 using LED or LCD material built into each display 201, 202.

An audio device 203 may be inserted in the user's ear or ears to provide sound from the AR generated environment. In another embodiment, a headset having one or more speakers may fit over the user's ear or ears.

The headset 200 may further include various position sensors in the controller 210. The sensors may be used to monitor movement of the users head such that, when the user moves their head, the AR content changes appropriate with the movement and direction that the user is looking. The sensors may include an accelerometer, an inclinometer, a compass, a global position system (GPS) receiver, or a gyroscope.

The controller 210 is coupled to the headset 200 to provide control of the AR system and execution of any methods represented by software instructions. The controller 210 may be a separate enclosure coupled to the headset 200 through a wired connection or a wireless connection (e.g., Bluetooth, WiFi). The controller 210 may also be part of the headset 200. An example of a controller 210 is illustrated in FIG. 3 and discussed subsequently.

In another AR system, the user may view the AR content through a mobile device 230 (e.g., tablet computer or smartphone). Device 230 includes a camera 231 on at least one side of the device 230 to capture images of the user's surroundings. The device 230 may then generate the AR content appropriate for the camera view and display both the view and the AR content on the device display 232 for viewing by the user.

One example of AR system operation may include the user looking at or pointing the device's camera 231 at a city street. The generated AR content may augment this view by displaying to the user, on the device display 232 or on the displays 201, 202, information about that street such as history text, address and/or business names, or other content selectable by and of interest to the user. As discussed subsequently with regard to the method of FIG. 4, the virtual guard rail method is able to limit the content provided to the user based on input from user biological sensors, user preferences, and AR content.

FIG. 3 illustrates a block diagram of the VR or AR systems, according to various embodiments. The system 300 may also be referred to as a computer or controller, such as controllers 110, 210 to execute any methods disclosed herein. This block diagram is for purposes of illustration only as other systems may have a different architecture and still be able to implement the virtual guard rail method.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, at least a part of one or more computer systems (e.g., a standalone, client or server computer system) or one or more hardware processors 202 may be configured by firmware or software (e.g., instructions, an application portion, or an application) as a module that operates to perform specified operations. In an example, the software may reside on a non-transitory computer readable medium. In an example, the software, when executed by the underlying hardware of the module, causes the hardware to perform the specified operations.

The system 300 may include a hardware processor 302 (e.g., a central processing unit (CPU), a graphics processing unit (GPU), a hardware processor core, or any combination thereof), and memory 304. The various elements of the computer may communicate with each other over an interlink (i.e., bus) 308.

The computer 300 may further include a display unit 310, such as displays 120, 201, or 202, and an alphanumeric input device 312 (e.g., a keypad) coupled to the interlink 308. In an example, the display unit 310 and the input device 312 together may be a touchscreen display. The touchscreen display may be incorporated in the tablet computer or smartphone device 230.

The system 300 may additionally include a storage device (e.g., flash memory, random access memory (RAM), read only memory (ROM), magnetic disk drive, optical disk drive) 316, a signal generation device 318 (e.g., a speaker), a sensor and network interface device 320, and one or more sensors 321. As described previously, the sensors may include position and movement sensors such as accelerometers, compasses, gyroscopes, altimeters, barometers, thermometers, vertical speed sensors, and/or GPS sensors and/or biological sensors such as heart rate, skin temperature, and/or perspiration measurement. The sensors 321 may be located in one or more locations of the system.

The memory 304 may include at least one transitory or non-transitory computer-readable medium on which is stored one or more sets of data structures or instructions 324 (e.g., software) embodying or utilized by any one or more of the techniques, methods, or functions described herein. The instructions 324 may also reside, at least partially, in additional computer-readable memories such within the hardware processor 302 during execution thereof by the system 300. In an example, one or any combination of the hardware processor 302, the memory 304 or the mass storage device 316 may constitute non-transitory computer-readable media.

The network interface device 320 may also be a sensor interface and include any wired or wireless interface, such as a radio, for reading sensors over a wireless channel. For example, the sensor interface may be a feedback device interface that communicates with remote sensors or feedback devices to collect data or transmit feedback signals to at least one of aural, haptic, or visual feedback devices.

The radio may operate using a Bluetooth®, an IEEE 802.11 standard, or any other standard for reading data from sensors over a wireless channel. The network may be a peer-to-peer network, a local area network (LAN), or a wide area network (WAN) including the Internet.

Embodiments of the virtual guard rail method may use available user biological and VR simulation data to protect a user from an unwanted VR simulation experience. After the system is calibrated to a particular user and has received user preferences, the method may be implemented on a client system (e.g., see FIGS. 1-3) to limit simulation content in real-time and prior to being presented to the user. Cues may be implemented to notify the user that guard rails are being enforced so that the user is not under the impression that a VR experience is not operating properly.

For example, the cues may include a touch cue, an audio cue, and/or a visual cue to notify the user that VR simulation limits are being enforced (e.g., virtual guard rails are being inserted). The touch cue may come from a hardware device that vibrates to notify the user that the VR simulation limits are being enforced. The audio cue may come from one or more sounds inserted into the VR simulation audio to notify the user that the VR simulation limits are being enforced. The visual cue may come from an un-obstructive image inserted into the VR simulation video that notifies the user that the VR simulation limits are being enforced.

Figure 4:
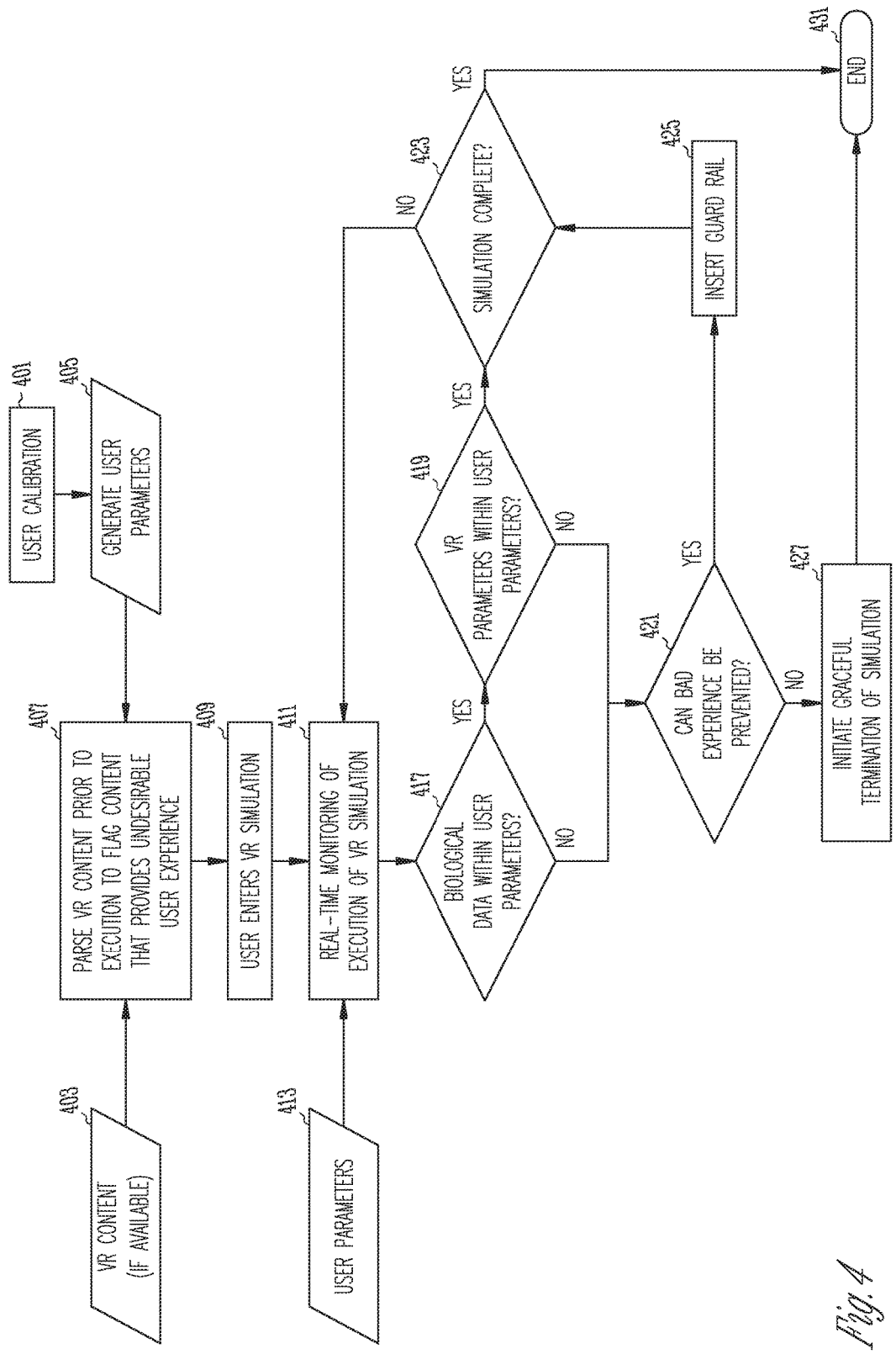
FIG. 4 illustrates a flowchart of a virtual guard rail method, according to various embodiments.

FIG. 4 illustrates a flowchart of the virtual guard rail method, according to various embodiments. An initial user calibration operation is performed at block 401. The user calibration may include determining a biological baseline (e.g., collecting initial user biological parameters) for the user as well as collecting user preferences.

Initial user biological parameters may be collected via any number of sources including biological sensors, image sensors pointed at the user, and/or sound sensors (e.g., microphones) close to the user. The initial user biological parameters may include the user's heart rate, respiration rate, skin temperature, and normal, unexcited voice patterns. These initial biological parameters are used as a baseline biological condition for when the user is at rest and in an unexcited state.

The initial biological parameters may be used for later comparison to updated biological parameters when the user is immersed in the VR simulation. An elevation in any of the initial biological parameters may signal an excited or agitated user condition while depression of biological parameters may indicate another condition. For example, an elevated heart rate, respiration rate, and/or higher pitched or more rapid voice pattern may signal that the user is excited or agitated.

The user biological parameters may also include movement of the user's limbs, head, and/or eyes. Such parameters may be collected using an imaging device (e.g., camera) pointed at the user. In an embodiment, the user movement parameters may not be part of the initial user biological parameters. The movement parameters may be useful later while the user is immersed in the VR simulation to determine the agitation or excitation state of the user while experiencing the simulation. The movement parameters may include: how fast a user is looking around, user jumping, user shielding head with arms, user running, user losing balance, and/or user actions inconsistent with the context of the VR simulation.

The user also has the option of inputting her or his user preferences as part of the user calibration. The user preferences may include the user's age, sex, known medical conditions that may affect the VR simulation (e.g., heart problems, medical issues that may mislead biological sensors), the users known tolerance level of excitement or agitation, whether they want to be subjected to certain situations, and/or what known objects in the VR simulation they do not wish to be exposed to. The user preferences may also include the maximum speed, the amount of mayhem, the relative speed of objects around the user, and/or the level of scariness to which the user wishes to be exposed.

The initial user biological parameters and the user preferences are collected together in block 405 to generate user parameters. In block 403, the VR content is collected, if available, and input to block 407 with the user parameters 405.

In block 407, the method parses the VR content to collect VR parameters that, based on the user parameters, may provide an undesirable VR simulation experience for the user. In an embodiment, the VR parameters may be collected from the client software prior to execution of the VR simulation. In another embodiment, the VR parameters are collected in real-time while the VR simulation is being executed and prior to being presented to the user. An undesirable user experience may be defined as any VR/AR simulation that may cause an uncomfortable user emotional response such as excitement, depression, anxiety, stress, and/or fear.

The VR parameters may be defined as simulation content that, based on the user parameters, may cause an undesirable user experience. The VR parameters include acceleration of the user through virtual space, a delta of new sound levels (e.g., in decibels) from previous sound levels; rotational acceleration of the user through virtual space, acceleration of speed of a virtual object relative to the user, a frequency of a flashing light, a third party rating of stress levels that the user may experience, and/or types of virtual assets included in the VR simulation (e.g., guns, knives, vicious creatures). These VR parameters are for purposes of illustration only as other embodiments may collect other parameters based on the user parameters.

In an example of operation of this step, it is assumed that the VR content includes hiking up Half Dome in Yosemite National Park. The method determines and analyzes all possible paths for hiking up Half Dome prior to execution of the VR simulation. It may then be determined if there are any undesirable hiking paths that may result in walking off the face of Half Dome and falling or come close to the edge of a cliff. These hiking paths may be limited or removed from the content based on user parameters indicating that the user is ten years old, is in frail health, or is afraid of heights. Block 407 of the method flags any of these images located in the VR content that would not be appropriate for a user having those user parameters. The flags may be a time stamp in the VR simulation or some other way of recording an indication and location of the undesirable content. This information is used later during execution of the VR simulation.

In block 409, the user enters the VR simulation and, in block 411, real-time monitoring of the VR simulation occurs based on the user parameter inputs from block 413. The real-time monitoring of block 411 may be used for VR content that was not previously available in block 403 as well as the VR content that was parsed in block 403. The VR content is monitored real-time prior to being presented to the user so that the guard rails may be inserted prior to the user being exposed to the undesirable content.

As part of the real-time monitoring of block 411, the virtual guard rail method is constantly determining next possible scenarios of the VR simulation and comparing them to the user parameters prior to the user being exposed to the scenario. The method is able to determine whether any of the next possible scenarios require insertion of a guard rail fast enough so that the user does not notice a delay in execution of the VR simulation.

In block 417, the user's biological data is monitored and compared to the initial user parameters from the calibration step. This step is useful if the content has not been parsed prior to execution of the VR simulation by the user. Since the VR parameters have not been collected in such an embodiment, the user's biological data should be monitored in order to know when their biological data exceeds the initial user parameters from the calibration.

If the biological data indicates that one or more of the monitored biological data is greater than its respective initial user parameter, the method continues to block 419 to determine if the VR simulation may be a cause of the increase of the user parameter.

Block 419 determines if the VR parameters are within the user parameters. In other words, if the user is on a VR roller coaster that is moving fairly fast but still within the user parameters as initially set, the roller coaster may turn a corner and launch the user into a VR freefall if the track were missing. Thus, the VR parameter (e.g., acceleration of user through VR space) may exceed the user parameter (e.g., not exceeding 90 mph). The step of block 419, in combination with the step of block 417, determines if the user's biological data is increased from the baseline data and, if the next scenario exceeds the user's maximum speed parameter or the simulation of plummeting to a digital demise. If either the user's biological data exceeds the user parameters (block 417) or the VR parameters exceed the user parameters (block 419), the method determines if the undesirable experience may be prevented by a virtual guard rail, in block 421.

The process of block 419 may also determine if user's actions are consistent with the VR simulation. For example, if a user is playing an alien invasion game where they walk through Area 51 and shoot aliens, erratic head movement and looking around is to be expected. In contrast, if the user is walking through a VR simulation that closely mirrors reality, (e.g. mall shopping) erratic head movements may not to be expected. If the user's actions are not consistent with the VR simulation, the VR parameters are not considered to be within the user parameters.

If it is possible to prevent the undesirable experience (decision block 421), block 425 inserts a virtual guard rail. In other words, the VR simulation content is altered, prior to the user experiencing that undesirable content, so that the user is exposed to more desirable simulation content that does not exceed the VR parameters. Various examples of guard rail implementation are discussed subsequently.

In block 423, it is determined if the simulation is complete. If not, the method repeats from the real-time monitoring step 411. If the simulation is complete, the method ends 431.

If it is not possible to insert a virtual guard rail into the content, the method performs a graceful termination of the simulation in block 427. In other words, instead of just coming to an abrupt halt, the simulation may remain within the desirable content that is within the user parameters for a few seconds prior to simply ending at block 431.

The following examples of virtual guard rails are for purposes of illustration only. Other examples of virtual guard rails may be used:

Slow motion mode—if it is detected that the VR simulation exceeds the VR parameters, the simulation may enter a slow motion mode. Using the Half Dome hiking example, if the user falls off the cliff, instead of falling at a normal rate, the VR simulation may slow the users fall so that they float down.

Virtual guard rail mode—if it is detected that the VR simulation is about to exceed the VR parameters, the simulation may prevent the user from taking another action or making the decision that will cause the simulation to reach that particular content. For example, instead of allowing the user to walk off the cliff, the simulation is altered so that the user has to stop at the edge of the cliff.

Noise attenuation mode—if it is detected that the VR simulation is about to exceed a noise delta as set in the user parameters, the simulation limits the volume. For example, when walking through a field of flowers, rather than letting a train horn blast, the horn sound could be changed to match the volume of the birds in the field.

Content filter mode—if it is detected that the VR simulation is about to exceed the VR parameters, that particular content may be removed completely if other virtual content cannot be added. For example, if the user is about to walk through a cave of bats and the user has added a fear of such creatures into the user parameters, the bats may be filtered out of the content and the user would simply walk into a cave.

Graceful ending mode—if it is detected that the VR simulation is about to exceed the VR parameters and there is no way to use a virtual guard rail (e.g., virtual guard rails cannot be implemented), the simulation may come to an end by fading to a peaceful scene such as an empty white room, an open field, or some other comforting environment.

One example of an AR guard rail might be to reduce motion sickness. For example, a user might wear AR glasses that project a scene onto the physical world of a stationary horizon as opposed to a moving horizon.

ADDITIONAL NOTES & EXAMPLES

Example 1 is a system to execute a virtual or augmented reality simulation, the system comprising: a display for displaying simulation content to a user; memory to store instructions representing the simulation content; and a controller coupled to the display and the memory to execute the instructions, wherein executing the instructions causes the controller to receive user parameters representing user limitations for the simulation content, monitor execution of the simulation for simulation content that exceeds the user parameters, wherein the monitoring is performed in real-time and prior to presentation of the simulation content on the display, and replace the simulation content that exceeds the user parameters with virtual guard rail content that remains within the user parameters.

In Example 2, the subject matter of Example 1 optionally includes sensors coupled to the controller, wherein the sensors comprise biological sensors and position or movement sensors.

In Example 3, the subject matter of Example 2 optionally includes wherein the biological sensors comprise at least one of a heart rate sensor, a skin temperature sensor, a sensor to measure user perspiration, an eye tracking sensor, or a respiration sensor and the position or movement sensors comprise at least one of an accelerometer, an inclinometer, a compass, a global position system (GPS) receiver, or a gyroscope.

In Example 4, the subject matter of any one or more of Examples 1-3 optionally include wherein the controller is further to parse VR content, prior to execution of the computer simulation, to find the VR parameters based on the user preferences.

In Example 5, the subject matter of any one or more of Examples 1-4 optionally include wherein the controller is further to initiate a graceful termination of the simulation if the simulation content cannot be replaced with virtual guard rail content.

In Example 6, the subject matter of Example 5 optionally includes wherein the controller is further to initiate the graceful termination by controlling a fade to a peaceful scene.

In Example 7, the subject matter of any one or more of Examples 1-6 optionally include wherein the controller is further to collect the user parameters to perform a user calibration operation to determine a user biological baseline.

In Example 8, the subject matter of any one or more of Examples 1-7 optionally include wherein the controller is further to control the display of the simulation content as a virtual reality simulation or an augmented reality simulation.

Example 9 is a method for virtual reality (VR) guard rail implementation, the method comprising: collecting user parameters representing user limitations for a computer simulation executed by a computer; monitoring execution of the computer simulation for content that exceeds the user parameters, wherein the monitoring is performed in real-time and prior to presentation of the content on a display to the user; and replacing the content that exceeds the user parameters with virtual guard rail content that remains within the user parameters.

In Example 10, the subject matter of Example 9 optionally includes wherein the computer simulation is one of a virtual reality simulation or an augmented reality simulation.

In Example 11, the subject matter of any one or more of Examples 9-10 optionally include wherein collecting the user parameters comprises performing a user calibration operation to determine a user biological baseline.

In Example 12, the subject matter of Example 11 optionally includes wherein collecting the user parameters comprises collecting user biological data including at least one of heart rate, respiration rate, skin temperature, unexcited voice patterns, limb movement, head movement, or eye movement.

In Example 13, the subject matter of any one or more of Examples 11-12 optionally include wherein collecting the user parameters comprises collecting user preferences including at least one of user age, sex, medical condition, tolerance level of excitement or agitation, known undesirable situations, maximum desirable speed, level of mayhem, or speed of objects relative to the user.

In Example 14, the subject matter of any one or more of Examples 9-13 optionally include parsing the content, prior to execution of the computer simulation, to collect virtual parameters that, based on the user parameters, provide an undesirable user experience in the computer simulation; and flagging the virtual parameters that exceed the user parameters.

In Example 15, the subject matter of Example 14 optionally includes wherein parsing the content to collect the virtual parameters comprises: collecting at least one of acceleration of the user through virtual space, a delta of new sound levels from previous sound levels, rotational acceleration of the user through virtual space, acceleration of speed of a virtual object relative to the user, a frequency of a flashing light, a third party rating of stress levels that the user may experience, or types of virtual assets included in the VR simulation.

In Example 16, the subject matter of any one or more of Examples 14-15 optionally include wherein flagging the virtual parameters comprises noting a time stamp in the computer simulation associated with the virtual parameter.

In Example 17, the subject matter of any one or more of Examples 9-16 optionally include monitoring user biological data during execution of the computer simulation; comparing the user biological data to the user parameters; and replacing, with the virtual guard rail content, the content that causes the monitored user biological data to exceed the user parameters.

In Example 18, the subject matter of any one or more of Examples 9-17 optionally include terminating the computer simulation in response to the content exceeding the user parameters when virtual guard rails cannot be implemented.

In Example 19, the subject matter of any one or more of Examples 9-18 optionally include removing the content that exceeds the user parameters when the content that exceeds the user parameters cannot be replaced with virtual guard rail content.

In Example 20, the subject matter of any one or more of Examples 9-19 optionally include wherein replacing the content that exceeds the user parameters with virtual guard rail content comprises limiting an audio volume of the content.

Example 21 is at least one computer-readable medium comprising instructions for executing virtual guard rails in a VR simulation that, when executed by a computer, cause the computer to perform any one of the method Examples 9-20.

Example 22 is an apparatus comprising means for performing any of the methods of Examples 9-20.

Example 23 is a system to execute a virtual or augmented reality simulation, the system comprising: a display for displaying simulation content to a user; memory to store instructions representing the simulation content; and a controller coupled to the display and the memory to execute the instructions, wherein executing the instructions causes the controller to receive user parameters representing user limitations for the simulation content, monitor execution of the simulation for simulation content that exceeds the user parameters, wherein the monitoring is performed in real-time and prior to presentation of the simulation content on the display, and replace the simulation content that exceeds the user parameters with virtual guard rail content that remains within the user parameters.

In Example 24, the subject matter of Example 23 optionally includes sensors coupled to the controller, wherein the sensors comprise biological sensors and position or movement sensors.

In Example 25, the subject matter of Example 24 optionally includes wherein the biological sensors comprise at least one of a heart rate sensor, a skin temperature sensor, a sensor to measure user perspiration, an eye tracking sensor, or a respiration sensor and the position or movement sensors comprise at least one of an accelerometer, an inclinometer, a compass, a global position system (GPS) receiver, or a gyroscope.

Example 26 is a method for virtual reality (VR) guard rail implementation in a computer simulation, the method comprising: performing a user calibration to generate a user biological baseline measured from biological sensors; generating user parameters based on the user biological baseline and user preferences; monitoring the computer simulation for VR parameters or simulation content that causes user biological data to exceed the user biological baseline; and replacing, with virtual guard rail content that remains within the user parameters, the simulation content represented by the VR parameters that exceeds the user parameters or the simulation content that causes the user biological data to exceed the user biological baseline.

In Example 27, the subject matter of Example 26 optionally includes parsing VR content, prior to execution of the computer simulation, to find the VR parameters based on the user preferences.

In Example 28, the subject matter of any one or more of Examples 26-27 optionally include initiating a graceful termination of the simulation if the simulation content cannot be replaced with virtual guard rail content.

In Example 29, the subject matter of Example 28 optionally includes wherein initiating the graceful termination comprises fading to a peaceful scene.

Example 30 is at least one computer-readable medium comprising instructions for executing virtual guard rail implementation in a computer simulation, when executed by a computer, cause the computer to: collect user parameters representing user limitations for a computer simulation executed by a computer; monitor execution of the computer simulation for content that exceeds the user parameters, wherein the monitoring is performed in real-time and prior to presentation of the content on a display to the user; and replace the content that exceeds the user parameters with virtual guard rail content that remains within the user parameters.

In Example 31, the subject matter of Example 30 optionally includes wherein the instructions further cause the computer to parse the content, prior to execution of the computer simulation, to collect virtual parameters that, based on the user parameters, provide an undesirable user experience in the computer simulation, and flag the virtual parameters that exceed the user parameters.

In Example 32, the subject matter of any one or more of Examples 30-31 optionally include wherein the instructions further cause the computer to monitor user biological data during execution of the computer simulation, compare the user biological data to the user parameters, and replace, with the virtual guard rail content, the content that causes the monitored user biological data to exceed the user parameters.

In Example 33, the subject matter of any one or more of Examples 30-32 optionally include wherein the instructions further cause the computer to terminate the computer simulation in response to the content exceeding the user parameters when virtual guard rails cannot be implemented.

In Example 34, the subject matter of any one or more of Examples 30-33 optionally include wherein the instructions further cause the computer to remove the content that exceeds the user parameters when the content that exceeds the user parameters cannot be replaced with virtual guard rail content.

In Example 35, the subject matter of any one or more of Examples 30-34 optionally include wherein the instructions further cause the computer to perform a user calibration operation to determine a user biological baseline and generate the user parameters.

Example 36 is a system for virtual guard rail implementation, the system comprising: means for collecting user parameters representing user limitations for a computer simulation executed by a computer; means for monitoring execution of the computer simulation for content that exceeds the user parameters, wherein the monitoring is performed in real-time and prior to presentation of the content on a display to the user; and means for replacing the content that exceeds the user parameters with virtual guard rail content that remains within the user parameters.

In Example 37, the subject matter of Example 36 optionally includes wherein the computer simulation is one of a virtual reality simulation or an augmented reality simulation.

In Example 38, the subject matter of any one or more of Examples 36-37 optionally include wherein the means for collecting the user parameters comprises means for performing a user calibration operation to determine a user biological baseline.

In Example 39, the subject matter of Example 38 optionally includes wherein the means for collecting the user parameters comprises means for collecting user biological data including at least one of heart rate, respiration rate, skin temperature, unexcited voice patterns, limb movement, head movement, or eye movement.

In Example 40, the subject matter of any one or more of Examples 38-39 optionally include wherein the means for collecting the user parameters comprises means for collecting user preferences including at least one of user age, sex, medical condition, tolerance level of excitement or agitation, known undesirable situations, maximum desirable speed, level of mayhem, or speed of objects relative to the user.

In Example 41, the subject matter of any one or more of Examples 36-40 optionally include means for parsing the content, prior to execution of the computer simulation, to collect virtual parameters that, based on the user parameters, provide an undesirable user experience in the computer simulation; and means for flagging the virtual parameters that exceed the user parameters.

In Example 42, the subject matter of Example 41 optionally includes wherein the means for parsing the content to collect the virtual parameters comprises: means for collecting at least one of acceleration of the user through virtual space, a delta of new sound levels from previous sound levels; rotational acceleration of the user through virtual space, acceleration of speed of a virtual object relative to the user, a frequency of a flashing light, a third party rating of stress levels that the user may experience, or types of virtual assets included in the VR simulation.

In Example 43, the subject matter of any one or more of Examples 41-42 optionally include wherein the means for flagging the virtual parameters comprises means for noting a time stamp in the computer simulation associated with the virtual parameter.

In Example 44, the subject matter of any one or more of Examples 36-43 optionally include means for monitoring user biological data during execution of the computer simulation; means for comparing the user biological data to the user parameters; and means for replacing, with the virtual guard rail content, the content that causes the monitored user biological data to exceed the user parameters.

In Example 45, the subject matter of any one or more of Examples 36-44 optionally include means for terminating the computer simulation in response to the content exceeding the user parameters when virtual guard rails cannot be implemented.

In Example 46, the subject matter of any one or more of Examples 36-45 optionally include means for removing the content that exceeds the user parameters when the content that exceeds the user parameters cannot be replaced with virtual guard rail content.

In Example 47, the subject matter of any one or more of Examples 36-46 optionally include wherein the means for replacing the content that exceeds the user parameters with virtual guard rail content comprises means for limiting an audio volume of the content.

Example 48 is a method for virtual reality (VR) guard rail implementation in a computer simulation, the method comprising: performing a user calibration to generate a user biological baseline measured from biological sensors; generating user parameters based on the user biological baseline and user preferences; monitoring the computer simulation for VR parameters or simulation content that causes user biological data to exceed the user biological baseline; and replacing, with virtual guard rail content that remains within the user parameters, the simulation content represented by the VR parameters that exceeds the user parameters or the simulation content that causes the user biological data to exceed the user biological baseline.

In Example 49, the subject matter of Example 48 optionally includes parsing VR content, prior to execution of the computer simulation, to find the VR parameters based on the user preferences.

In Example 50, the subject matter of any one or more of Examples 48-49 optionally include initiating a graceful termination of the simulation if the simulation content cannot be replaced with virtual guard rail content.

In Example 51, the subject matter of any one or more of Examples 48-50 optionally include wherein initiating the graceful termination comprises fading to a peaceful scene.

Example 52 is at least one computer-readable medium comprising instructions for executing virtual guard rails in a VR simulation that, when executed by a computer, cause the computer to perform any one of the method Examples 48-51.

Example 53 is an apparatus comprising means for performing any of the methods of Examples 48-51.

Example 54 is a system for virtual reality (VR) guard rail implementation in a computer simulation, the system comprising: means for performing a user calibration to generate a user biological baseline measured from biological sensors; means for generating user parameters based on the user biological baseline and user preferences; means for monitoring the computer simulation for VR parameters or simulation content that causes user biological data to exceed the user biological baseline; and means for replacing, with virtual guard rail content that remains within the user parameters, the simulation content represented by the VR parameters that exceeds the user parameters or the simulation content that causes the user biological data to exceed the user biological baseline.

In Example 55, the subject matter of Example 54 optionally includes means for parsing VR content, prior to execution of the computer simulation, to find the VR parameters based on the user preferences.

In Example 56, the subject matter of any one or more of Examples 54-55 optionally include means for initiating a graceful termination of the simulation if the simulation content cannot be replaced with virtual guard rail content.

In Example 57, the subject matter of Example 56 optionally includes wherein initiating the graceful termination comprises fading to a peaceful scene.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodi-

What is claimed is:

1. A system execute a virtual or augmented reality simulation, the system comprising:
a display for displaying simulation content to a user;
memory to store instructions representing the simulation content; and
a controller coupled to the display and the memory to execute the instructions, wherein executing the instructions causes the controller to receive user parameters representing user limitations for the simulation content, monitor execution of the simulation for simulation content that exceeds the user parameters, wherein the monitoring is performed in real-time and prior to presentation of the simulation content on the display, replace the simulation content that exceeds the user parameters with virtual guard rail content that remains within the user parameters, and initiate a graceful termination of the simulation if the simulation content cannot be replaced with virtual guard rail content.

2. The system of claim 1, further comprising sensors coupled to the controller, wherein the sensors comprise biological sensors and position or movement sensors.

3. The system of claim 2, wherein the biological sensors comprise at least one of a heart rate sensor, a skin temperature sensor, a sensor to measure user perspiration, an eye tracking sensor, or a respiration sensor and the position or movement sensors comprise at least one of an accelerometer, an inclinometer, a compass, a global position system (GPS) receiver, or a gyroscope.

4. The system of claim 1, wherein the controller is further to parse VR content, prior to execution of the computer simulation, to find the VR parameters based on the user preferences.

5. The system of claim 1, wherein the controller is further to initiate the graceful termination by controlling a fade to a peaceful scene.

6. The system of claim 1, wherein the controller is further to collect the user parameters to perform a user calibration operation to determine a user biological baseline.

7. The system of claim 1, wherein the controller is further to control the display of the simulation content as a virtual reality simulation or an augmented reality simulation.

8. A method for virtual reality (VR) guard rail implementation, the method comprising:
collecting user parameters representing user limitations for a computer simulation executed by a computer;
monitoring execution of the computer simulation for content that exceeds the user parameters, wherein the monitoring is performed in real-time and prior to presentation of the content on a display to the user;
replacing the content that exceeds the user parameters with virtual guard rail content that remains within the user parameters; and
initiating a graceful termination of the simulation if the simulation content cannot be replaced with virtual guard rail content.

9. The method of claim 8, wherein the computer simulation is one of a virtual reality simulation or an augmented reality simulation.

10. The method of claim 8, wherein collecting the user parameters comprises performing a user calibration operation to determine a user biological baseline.

11. The method of claim 10, wherein collecting the user parameters comprises collecting user biological data including at least one of heart rate, respiration rate, skin temperature, unexcited voice patterns, limb movement, head movement, or eye movement.

12. The method of claim 10, wherein collecting the user parameters comprises collecting user preferences including at least one of user age, sex, medical condition, tolerance level of excitement or agitation, known undesirable situations, maximum desirable speed, level of mayhem, or speed of objects relative to the user.

13. The method of claim 8, further comprising:
parsing the content, prior to execution of the computer simulation, to collect virtual parameters that, based on the user parameters, provide an undesirable user experience in the computer simulation; and
flagging the virtual parameters that exceed the user parameters.

14. The method of claim 13, wherein parsing the content to collect the virtual parameters comprises:
collecting at least of acceleration of the user through virtual space, a delta of new sound levels from previous sound levels, rotational acceleration of the user through virtual space, acceleration of speed of a virtual object relative to the user, a frequency of a flashing light, a third party rating of stress levels that the user may experience, or types of virtual assets included in the VR simulation.

15. A method for virtual reality (VR) guard rail implementation in a computer simulation, the method comprising:
performing a user calibration to generate a user biological baseline measured from biological sensors;
generating user parameters based on the user biological baseline and user preferences;
monitoring the computer simulation for VR parameters or simulation content that causes user biological data to exceed the user biological baseline;
replacing, with virtual guard rail content that remains within the user parameters, the simulation content represented by the VR parameters that exceeds the user parameters or the simulation content that causes the user biological data to exceed the user biological baseline; and
initiating a graceful termination of the simulation if the simulation content cannot be replaced with virtual guard rail content.

16. The method of claim 15, further comprising parsing VR content, prior to execution of the computer simulation, to find the VR parameters based on the user preferences.

17. The method of claim 15, wherein initiating the graceful termination comprises fading to a peaceful scene.

18. At least one non-transitory computer-readable medium comprising instructions for executing virtual guard rail implementation in a computer simulation, when executed by a computer, cause the computer to:
collect user parameters representing user limitations for a computer simulation executed by a computer;
monitor execution of the computer simulation for content that exceeds the user parameters, wherein the monitoring is performed in real-time and prior to presentation of the content on a display to the user;
replace the content that exceeds the user parameters with virtual guard rail content that remains within the user parameters; and
terminate the computer simulation in response to the content exceeding the user parameters when virtual guard rails cannot be implemented.

19. The non-transitory computer-readable medium of claim 18, wherein the instructions further cause the computer to parse the content, prior to execution of the computer simulation, to collect virtual parameters that, based on the user parameters, provide an undesirable user experience in the computer simulation, and flag the virtual parameters that exceed the user parameters.

20. The non-transitory computer-readable medium of claim 18, wherein the instructions further cause the computer to monitor user biological data during execution of the computer simulation, compare the user biological data to the user parameters, and replace, with the virtual guard rail content, the content that causes the monitored user biological data to exceed the user parameters.

21. The non-transitory computer-readable medium of claim 18, wherein the instructions further cause the computer to remove the content that exceeds the user parameters when the content that exceeds the user parameters cannot be replaced with virtual guard rail content.

22. The non-transitory computer-readable medium of claim 21, wherein the instructions further cause the computer to perform a user calibration operation to determine a user biological baseline and generate the user parameters.

* * * * *

UNITED STATES PATENT AND TRADEMARK OFFICE
CERTIFICATE OF CORRECTION

PATENT NO. : 10,169,920 B2
APPLICATION NO. : 15/274648
DATED : January 1, 2019
INVENTOR(S) : Kukis et al.

Page 1 of 1

It is certified that error appears in the above-identified patent and that said Letters Patent is hereby corrected as shown below:

In the Claims

In Column 15, Line 5, in Claim 1, after "system", insert --to--

In Column 16, Line 19, in Claim 14, after "least", insert --one--

Signed and Sealed this
Twenty-first Day of April, 2020

Andrei Iancu
*Director of the United States Patent and Trademark Office*